(12) United States Patent
Luo et al.

(10) Patent No.: US 9,406,027 B2
(45) Date of Patent: Aug. 2, 2016

(54) MAKING PREDICTIONS REGARDING EVALUATION OF FUNCTIONS FOR A DATABASE ENVIRONMENT

(75) Inventors: Congnan Luo, San Diego, CA (US);
Heng Yuan, San Diego, CA (US);
Michael Reed, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 146 days.

(21) Appl. No.: 13/310,996

(22) Filed: Dec. 5, 2011

(65) Prior Publication Data

US 2013/0144815 A1 Jun. 6, 2013

(51) Int. Cl.
*G06N 5/04* (2006.01)
*G06N 99/00* (2010.01)

(52) U.S. Cl.
CPC .............. *G06N 99/005* (2013.01); *G06N 5/04* (2013.01)

(58) Field of Classification Search
USPC ...................................................... 706/12, 45
See application file for complete search history.

(56) References Cited

PUBLICATIONS

Sigg, et al., Expectation-Maximization for Sparse and Non-Negative PCA, Proceedings of the 25th International Conference on Machine Learning, 2008, pp. 960-967.*
Samaniego, et al., Supervised Classification of Remotely Sensed Imagery Using a Modified k-NN Technique, IEEE Transactions on Geoscience and Remote Sensing, vol. 46, No. 7, Jul. 2008, pp. 2112-2125.*

* cited by examiner

*Primary Examiner* — Wilbert L Starks
(74) *Attorney, Agent, or Firm* — Ramin Mahboubian

(57) ABSTRACT

A prediction regarding one or more functions can be made for a database environment. In particular, a predication can be made with respect to values stored in at least one column of at least one table in a database, based on the evaluation of one or more functions for a subset of possible column values (i.e., resultant values derived from the evaluation of a subset of possible column values) without the need to calculate the function(s) for all of the actual entries in the column of the table(s). In effect, a functional predicate can be transformed (or translated) to a predicate that is dependent on the column values instead of the evaluation of one or more functions for the column values.

15 Claims, 11 Drawing Sheets

MAKING PREDICTIONS REGARDING EVALUATION OF FUNCTIONS FOR A DATABASE ENVIRONMENT

BACKGROUND

The term database can refer to a collection of data and/or data structures typically stored in a digital form. Data can be stored in a database for various reasons and to serve various entities or "users." Generally, data stored in the database can be used by the database users. A user of a database can, for example, be a person, a database administrator, a computer application designed to interact with a database, etc. A very simple database or database system can, for example, be provided on a Personal Computer (PC) by storing data on a Hard Disk (e.g., contact information) and executing a computer program that allows access to the data. The executable computer program can be referred to as a database program or a database management program. The executable computer program can, for example, retrieve and display data (e.g., a list of names with their phone numbers) based on a request submitted by a person (e.g., show me the phone numbers of all my friends in Ohio).

Generally, database systems are much more complex than the example noted above. In addition, databases have been evolved over the years and some databases that are for various business and organizations (e.g., banks, retail stores, governmental agencies, universities) in use today can be very complex and support several users simultaneously by providing very complex queries (e.g., give me the name of all customers under the age of thirty five (35) in Ohio that have bought all items in a list of items in the past month in Ohio and also have bought ticket for a baseball game in San Diego and purchased a baseball in the past 10 years).

Typically, a Database Manager (DM) or a Database Management System (DBMS) is provided for relatively large and/or complex databases. As known in the art, a DBMS can effectively manage the database or data stored in a database, and serve as an interface for the users of the database. A DBMS can be provided as an executable computer program (or software) product as is also known in the art.

It should also be noted that a database can be organized in accordance with a Data Model. Notable Data Models include a Relational Model, an Entity-relationship model, and an Object Model. The design and maintenance of a complex database can require highly specialized knowledge and skills by database application programmers, DBMS developers/programmers, database administrators (DBAs), etc. To assist in design and maintenance of a complex database, various tools can be provided, either as part of the DBMS or as free-standing (stand-alone) software products. These tools can include specialized Database languages (e.g., Data Description Languages, Data Manipulation Languages, Query Languages). Database languages can be specific to one data model or to one DBMS type. One widely supported language is Structured Query Language (SQL) developed, by in large, for Relational Model and can combine the roles of Data Description Language, Data Manipulation language, and a Query Language.

Today, databases have become prevalent in virtually all aspects of business and personal life. Moreover, database use is likely to continue to grow even more rapidly and widely across all aspects of commerce. Generally, databases and DBMS that manage them can be very large and extremely complex partly in order to support an ever increasing need to store data and analyze data. Typically, larger databases are used by larger organizations. Larger databases are supported by a relatively large amount of capacity, including computing capacity (e.g., processor and memory) to allow them to perform many tasks and/or complex tasks effectively at the same time (or in parallel). On the other hand, smaller databases systems are also available today and can be used by smaller organizations. In contrast to larger databases, smaller databases can operate with less capacity.

A popular type of database is the relational Database Management System (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

One important objective of databases and in particular DBMS is to optimize the performance of queries for access and manipulation of data stored in the database. Given a target environment, an "optimal" query plan can be selected as the best option by a database optimizer (or optimizer). Ideally, an optimal query plan is a plan with the lowest cost (e.g., lowest response time, lowest CPU and/or I/O processing cost, lowest network processing cost). The response time can be the amount of time it takes to complete the execution of a database operation, including a database request (e.g., a database query) in a given system. In this context, a "workload" can be a set of requests, which may include queries or utilities, such as, load that have some common characteristics, such as, for example, application, source of request, type of query, priority, response time goals, etc.

In view of the prevalence of databases in various aspects life today and importance of optimization of database operations, it is apparent techniques that could further optimize database operations would be very useful.

SUMMARY

Broadly speaking, the invention relates to computing systems and computing environments. More particularly, the invention relates to techniques for making predictions estimations about a database.

In accordance with one aspect of the invention, a prediction regarding one or more functions can be made. This predication can be made with respect to values stored in at least one column of at least one table in a database, based on the evaluation of the function(s) for a subset of possible column values (i.e., resultant values derived from the evaluation of the subset of possible column values) without the need to calculate the one or more functions for all of the actual entries in the column of the table(s). In effect, a functional predicate can be transformed (or translated) to a predicate that is dependent on the column values instead of the evaluation of one or more functions for the column values. Of course, generally, a predicate dependent on the column values can be evaluated more easily than a functional predicate of the column values. In fact, a predicate that is dependent on the column values can often be made based on statistics on the column values that are already present in modern database systems.

In accordance with another aspect of the invention, the subset of possible column values can be selected based on the actual distribution of the column values to further increase accuracy of a prediction about a database operation that is dependent on the evaluation of at least one function for one or more columns of the database.

The invention can be implemented in numerous ways, including, for example, a method, an apparatus, a computer readable medium, a database system, and a computing system (e.g., a computing device). A computer readable medium can, for example, include at least executable code stored in a tangible or non-transient form.

For example, in one embodiment, a computing system can be operable to obtain multiple resultants values that have been determined by evaluating one or more functions for a subset of possible column values of at least one column of at least one table of a database; and make a prediction regarding the one or more functions based on the multiple resultants values.

Other aspects, embodiment and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
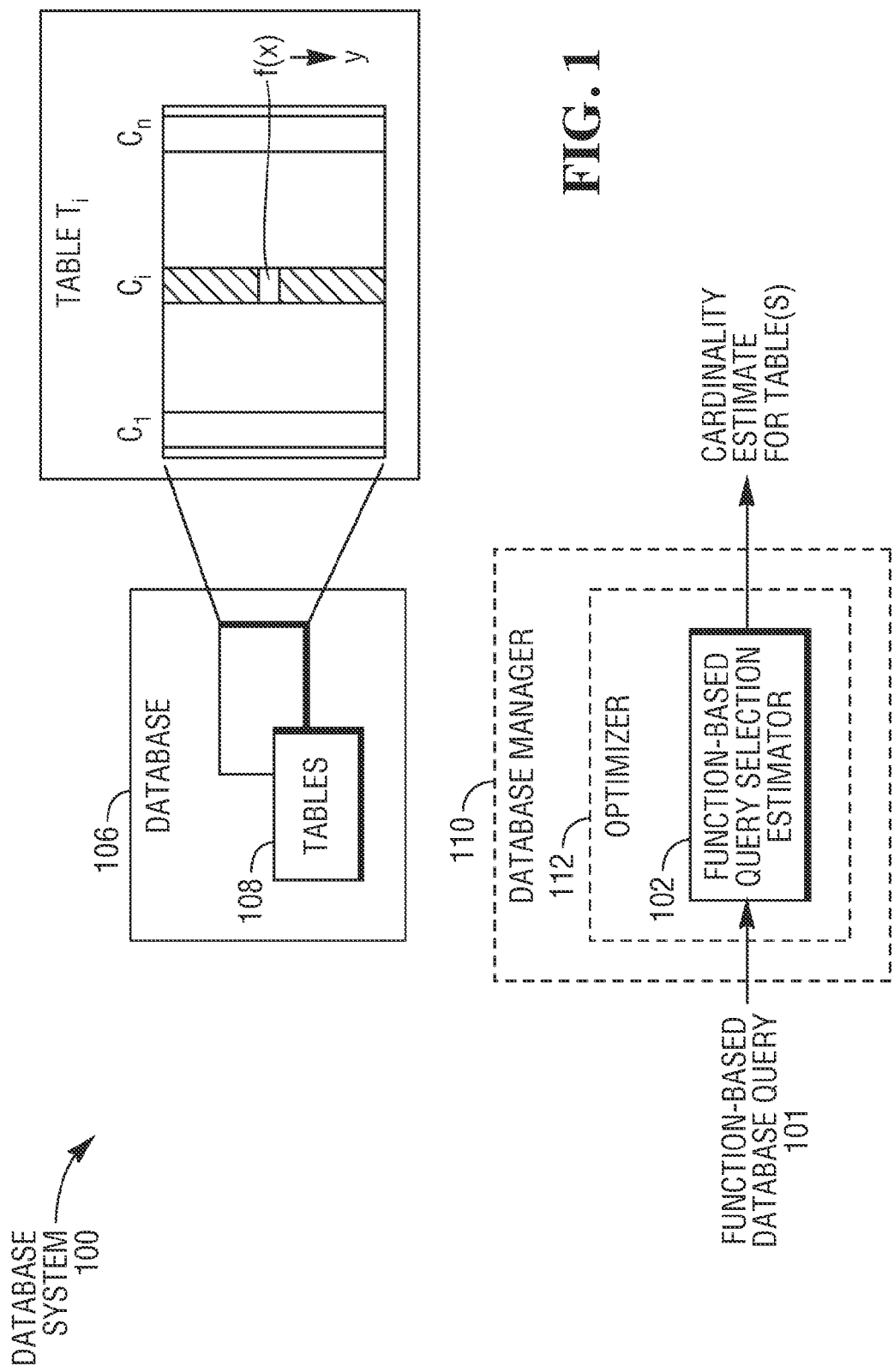
FIG. 1 depicts a database system that includes a function-based query selective estimator in accordance with one embodiment of the invention.

As noted in the background section, databases have become prevalent in virtually all aspects of business and personal life. Moreover, database use is likely to grow even more rapidly and widely across all aspects of commerce. Generally, databases and DBMS that manage them can be very large and extremely complex, partly in order to support an ever increasing need to store data and analyze data. Typically, larger databases are used by larger organizations. Larger databases are supported by a relatively large amount of capacity, including computing capacity (e.g., processor, memory, Input and Output (I/O) capabilities) to allow them to perform many tasks and/or complex tasks effectively at the same time (or in parallel). On the other hand, smaller databases systems are also available today and can, for example, be used by smaller organizations. In contrast to larger databases, smaller databases can operate with less capacity. In either case, however, techniques that could further optimize database operations would be very useful.

In particular, improved techniques for evaluating or estimating database operations (e.g., database queries) that are dependent on one or more functions are needed. Conventionally, all the column values in one or more columns involved in at least one functional predicate—a predicate that is based on evaluation of at least one function—can be calculated in order to make a prediction regarding, for example, a database query which is based on the functional predicate(s) (e.g., rows with Sin function (Sin(x)) of values in a particular column of a database table evaluating to be between 0.1 and 0.3).

As those skilled in the art will readily appreciate calculating all of the entries involved in a functional predicate can be too costly to justify the expense of performing the optimizations. Although, such information may be stored as statistics (e.g., "expression statistics" as generally known in the art) for future use, it may not be effective to take this approach, especially when the functional predicate is dependent on an variable input that is provided at the time when a query is submitted, notwithstanding that fact that using storage capacity to store this type of static may not desirable and/or feasible for some systems and database applications.

Accordingly, improved techniques for evaluating or estimating database operations (e.g., database queries) that are dependent on one are functions are needed and would be very useful, especially given the prevalence of the database systems in various aspects of business and life in the world today.

It will be appreciated that in accordance with one aspect of the invention, a prediction regarding one or more functions can be made. This predication can be made with respect to values stored in at least one column of at least one table in a database, based on the evaluation of the function(s) for a subset of possible column values (i.e., resultant values derived from the evaluation of the subset of possible column values) without the need to calculate the one or more functions for all of the actual entries in the column of the table(s). In effect, a functional predicate can be transformed (or translated) to a predicate that is dependent on the column values instead of the evaluation of one or more functions for the column values. Of course, generally, a predicate dependent on the column values can be evaluated more easily than a functional predicate of the column values. In fact, a predicate that is dependent on the column values can often be made based on statistics on the column values that are already present in modern database systems.

In accordance with another aspect of the invention, the subset of possible column values can be selected based on the actual distribution of the column values to further increase accuracy of a prediction about a database operation that is dependent on the evaluation of at least one function for one or more columns of the database.

Embodiments of these aspects of the invention are also discussed below with reference to FIGS. 1-7. However, those skilled in the art will readily appreciate that the detailed description given herein with respect to these figures is for explanatory purposes as the invention extends beyond these limited embodiments.

FIG. 1 depicts a database system 100 that includes a function-based query selective estimator ("selective estimator" hereinafter) 102 in accordance with one embodiment of the invention. As suggested by FIG. 1, the database system 100 may include a database manager 110 (e.g., Database Management System (DBMS), a Relational Database Management System (RDBMS)). As such, the selective estimator 102 may, for example, be provided as a part of the database manager 110. More particularly, it will be appreciated that the selective estimator 102 can be provided as a part of an optimizer 112 in the database manager 110. Of course, as shown in FIG. 1, the function-based query selective estimator 102 can be provided as a separate component. Those skilled in the art will also readily appreciate that the function-based query selective estimator 102 can be implemented at least partly as a computer executable program and/or as a hardware component. For example, the function-based query estimator 102 can be an executable computer code stored in memory (not shown) and executed by one or more processors (not shown).

In any case, it will be appreciated that the selective estimator 102 can make estimations regarding one or more database operations, including function-based database quires and/or operations 104 associated with a database 106. By way of example, a function-based database query 104 can be a database query that is based on evaluations of one or more functions for values in at least one column ($C_i$) of at least one table ($T_i$) of multiple tables 108 of the database 106. By way of example, the selective estimator 102 can receive a database query 104 pertaining to the rows in the table $C_i$ that meet one or more functional predicates (e.g., all rows where the Sin(x) of a particular column value (x) corresponding to a measured angle evaluates to be between 0.25 and 0.40). Generally, a functional predicate can be a predicate which is based on evaluation of at least one function for at least one column value. Conventionally, the function can be evaluated (e.g., calculated) for each and every one of the values in a column involved in the functional predicate in order to make a prediction regarding a database query that is based on a functional predicate (e.g., in order to determine how many rows in a table would have their Sin(x) evaluated to be between 0.25 and 0.40). This means that all of the database entries for a column $C_i$ involved in a functional predicate have to be obtained and each one of the functions in the functional predicate has to be evaluated for each one the entries in the column. Those skilled in the art will readily appreciate that reading and calculating all of these values can be relatively time consuming and computational expensive to a point where it may not be worthwhile to make the prediction in order to optimize execution of a database query.

It will be appreciated that the estimator 102 can make a prediction regarding a database query 104 (i.e., a database query that is based on a functional predicate) without requiring evaluation of all of the values in a column. Instead, the selective estimator 102 can effectively make a prediction regarding a database query 104 by evaluating only a subset of selected possible column values.

More particularly, the selective estimator 102 can obtain (e.g., determine, receive, select) a subset of possible column values and use it a basis for making a predication regarding a function-based database query 104. In doing so, only the functional values of the selected subset of possible column values need to be considered by the selective estimator 102. It should be noted that the number of the selected possible column values can be chosen to be significantly smaller than the total number of column entries. Also, it will be appreciated that the selective estimator 102 can effectively translate a function-based predicate to a predicate based on column values (values in one or more columns) which can be evaluated based on column values rather than functional values of the column values. As those skilled in the art will readily know that information regarding column values (or statists on column values) can be readily available as they can serve various other purposes.

Figure 2:
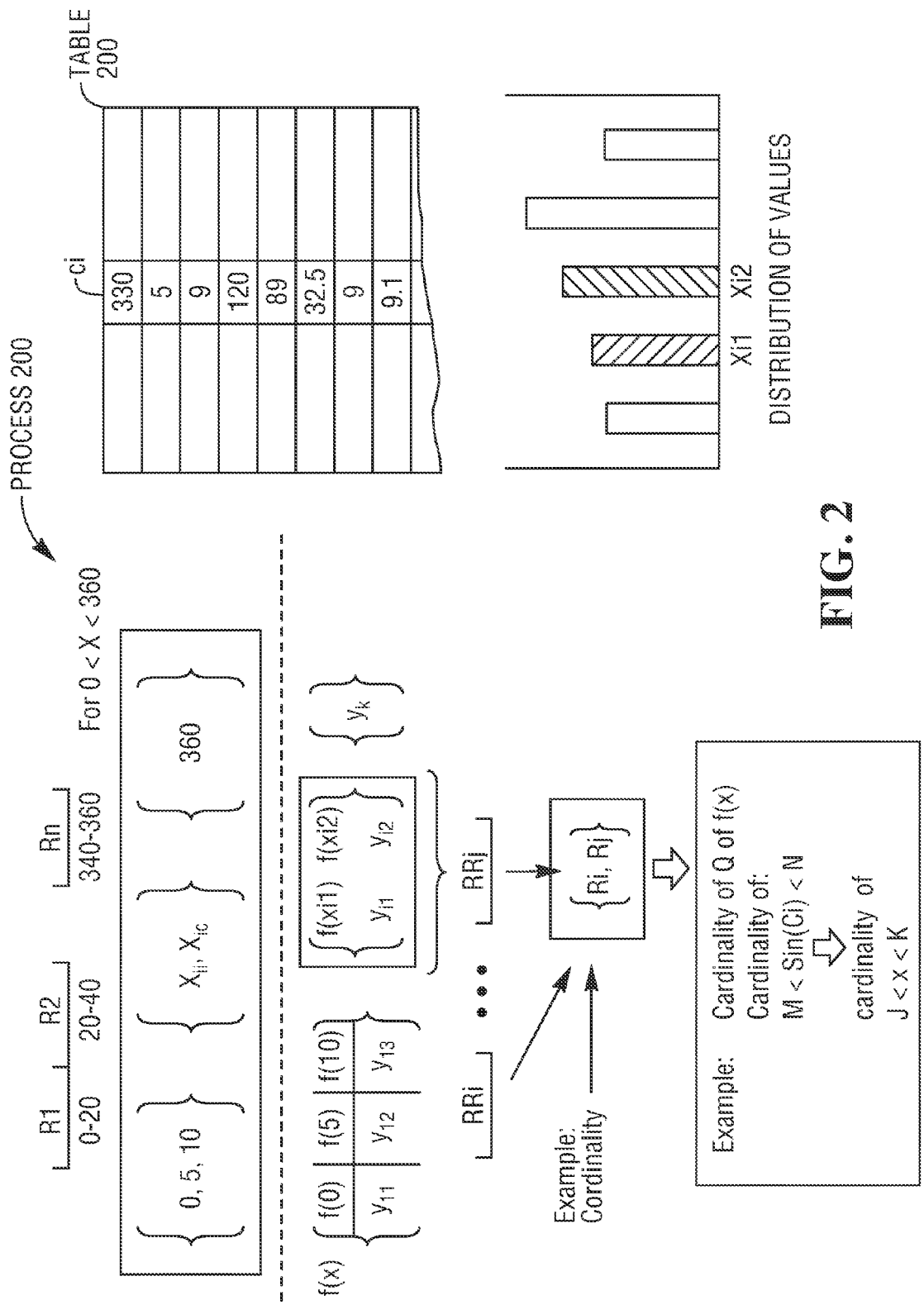
FIG. 2 depicts a very simple table and illustrates an exemplary simplified process for making a prediction regarding a function-based query made in connection with the table.

To further elaborate FIG. 2 depicts a very simple table 200 and illustrates an exemplary simplified process 202 for making a prediction regarding a function-based query made in connection with the table 200. The process for making the prediction can, for example, be used by the function-based query selective estimator 102 depicted in FIG. 1. Referring to FIG. 2, initially, multiple ranges of values (R1 ... RN) for a column Ci are obtained (e.g., determined, selected, receive). It should be noted that column Ci is involved in a functional-based query that includes at least one functional predicate, for example, for selecting rows with (0.3<Sin(Ci)<0.4) where Ci may, for example, represent a measured value of an angle "x" between zero (0) to three hundred sixty (360) degrees. As such, the multiple range of values (R1 ... RN) for a column Ci can, for example, be values between 0–20 (R1), 20–40 (R2), ..., 340–360 (RN), and so on.

After multiple ranges of values (R1 ... RN) have been obtained, a number of selection point values can be obtained. It should be noted that the selection points need not necessarily represent values that that are actually in table 200. As such, a selection point value in a range can be possible value in that range. In other words, for each one of the range of column values, a subset of possible column values in the range of column values are selected evaluation point values in that range. For example, possible values of {0, 5 and 10} can be selected in the range R1 as possible values, and so on. It will be appreciated that the number of points selected in a range can depend on the actual distribution of actual entries in the column Ci of table 200. As such, if there are, for example, relatively more values in the range R1 in column Ci of table 200 than values in the range R2, more evaluation points can be selected in R1 than R2.

In any case, it should be noted that the number of evaluation points ($\{0, 5, 10, \ldots, x_{i1}, x_{i2}, \ldots, 360\}$) selected for a range can be less, possibly by far, in comparison with the number of actual entries in the column Ci that are in that range. As such, the total number of entries in the column Ci could by far exceed that total number of selected evaluation points.

Referring to FIG. 2 again, the function involved in the function-based predicate (e.g., Sin(x)) can be evaluated for each one of the selected evaluation points $\{0, 5, 10, \ldots, x_{i1}, x_{i2}, \ldots, 360\}$. The resultant values $\{Y_{11}, Y_{12} \ldots Y_k\}$ can be compared with the functional values to effectively identify one or more ranges of the resultant values that include values that are responsive to the functional predicate. For example, it can be determined that two resultant ranges RRi and RRj are only responsive to the functional predicate. Typically, a resultant range RRi can correspond to a range of column values RX. As such, a predication which is based on a functional predicate can effectively be translated to a predicate based on column values which can be evaluated based on column values. By way of example, cardinality of a functional-based predicate in a database query can be determined based on cardinality of column values. The cardinality of a functional-based predicate can be indicative of how many rows of the table 200 would be involved (e.g., returned) in a database query or operation.

To elaborate even further, an example involving an estimation of the cardinality of a query with functions in its predicate will be discussed in greater detail. The predicate might be a selectivity predicate in a WHERE clause or a join predicate in an ON clause. The function might be a system function or a UDF (user defined function). The following query provides a good example of challenges the estimating the cardinality of such queries presents:

Query1:
  SELECT S1.a, S1.b, S1.c, S2.a, S2.b, S3.a, S3.b, S3.c FROM
    (SELECT t1.a, t1.b, t1.c FROM t1 WHERE t1.a > 120) AS S1(a, b, c),
    (SELECT t2.a, t2.b FROM t2 WHERE myUDF(t2.a) > 0.5) AS S2(a, b),

```
(SELECT t3.a, t3.b, t4.a FROM t3 INNER JOIN t4 ON myUDF(t3.a) = t4.a) AS
S3(a, b, c),
WHERE S1.a = S2.a AND S2.b = S3.b AND S1.c = S3.c;
```

In the Example above, Query 1 will join the result sets of three sub-queries S1, S2 and S3. The overall performance highly depends on the join plan, which could be in one of three possible join orders (S1∞S2)∞S3, (S1∞S3)∞S2, or (S2∞S3)∞S1. To choose the best order, an optimizer may need to estimate the cardinality of S1, S2, and S3, respectively. Today, a significant number if not most databases support collecting statistics on a table column. So, it would not be a problem to estimate the cardinality of S1 as long as the statistics on t1.a is available. However, since the function "myUDF" is called in the predicates of S2 and S3, the statistics on column t2.a and t3.a will not help at all. As a result, the optimizer may not be able to make an accurate estimate of the cardinality of S2 and S3, and consequently not make an optimal decision for the join plan.

For sub-query S2, the selectivity predicate is "WHERE myUDF(t2.a)>0.5". The cardinality estimation is to estimate how many rows in t2 which can make "myUDF(t2.a)>0.5" true. The more accurate the estimation is, the more it can help the optimizer to make the right decision. The same is true for the join predicate "ON myUDF(t3.a)=t4.b". What is needed is an accurate estimate of the number of pairs of rows from t3 and t4 which can make "myUDF(t3.a)=t4.b" true.

Of course, one conventional solution to this problem is expression statistics of a function on a table column. But this approach may be very costly, especially given the relatively large cost of collecting statistics in large systems available today. For example, given a table with billions rows, collecting expression statistics on a table column that a UDF will be called on may require executing the UDF a billion times, each for a column value in every row. If there are ten (10) functions that are often called on one column of five (5) different tables, there would also be a need to collect ten times five (10*5) expression statistics, and so on.

In addition, this approach may not work for some situations. For example, if the sub-query S2 is like:

```
SELECT t2.a, t2.b FROM t2 WHERE myUDF_2
    (t2.a,100)>0.5
```

The function myUDF_2( ) now has two parameters. The second parameter is a constant that can, for example, be provided by the user on the fly. In this situation, it would not be known what statistics should be collected because the function expression is unknown until the query is submitted.

Although it might be impracticable to find a cure-all solution to the problem of cardinality estimation for function predicates, it will be appreciated that the mathematic property of the function and the nature of the data can often allow tackling this problem for a large sub-set of situations in real-life applications, especially when a function is a continuous numeric function such as, for example, a polynomial, exponential, logarithmic, or trigonometric function, etc., or when there are only small or mid number of distinct values in the column that the function will be called on. In such cases, a predicate on a function can effectively be transformed to an approximately equivalent predicate on the table column that the function is called on. Consequently, a cardinality estimation of the transferred predicate can be determined by using the column statistics which can be already present in a database system. This estimation result on the transferred predicate can be virtually identical or at least close to an estimation of the original predicate using conventional brute force techniques, yet it can take significantly less time and computational resources to estimate the transferred predicate. At the same time, this enhancement also allows faster table scans using the approximately equivalent predicate as those skilled in the art will readily appreciate.

Figure 2A:
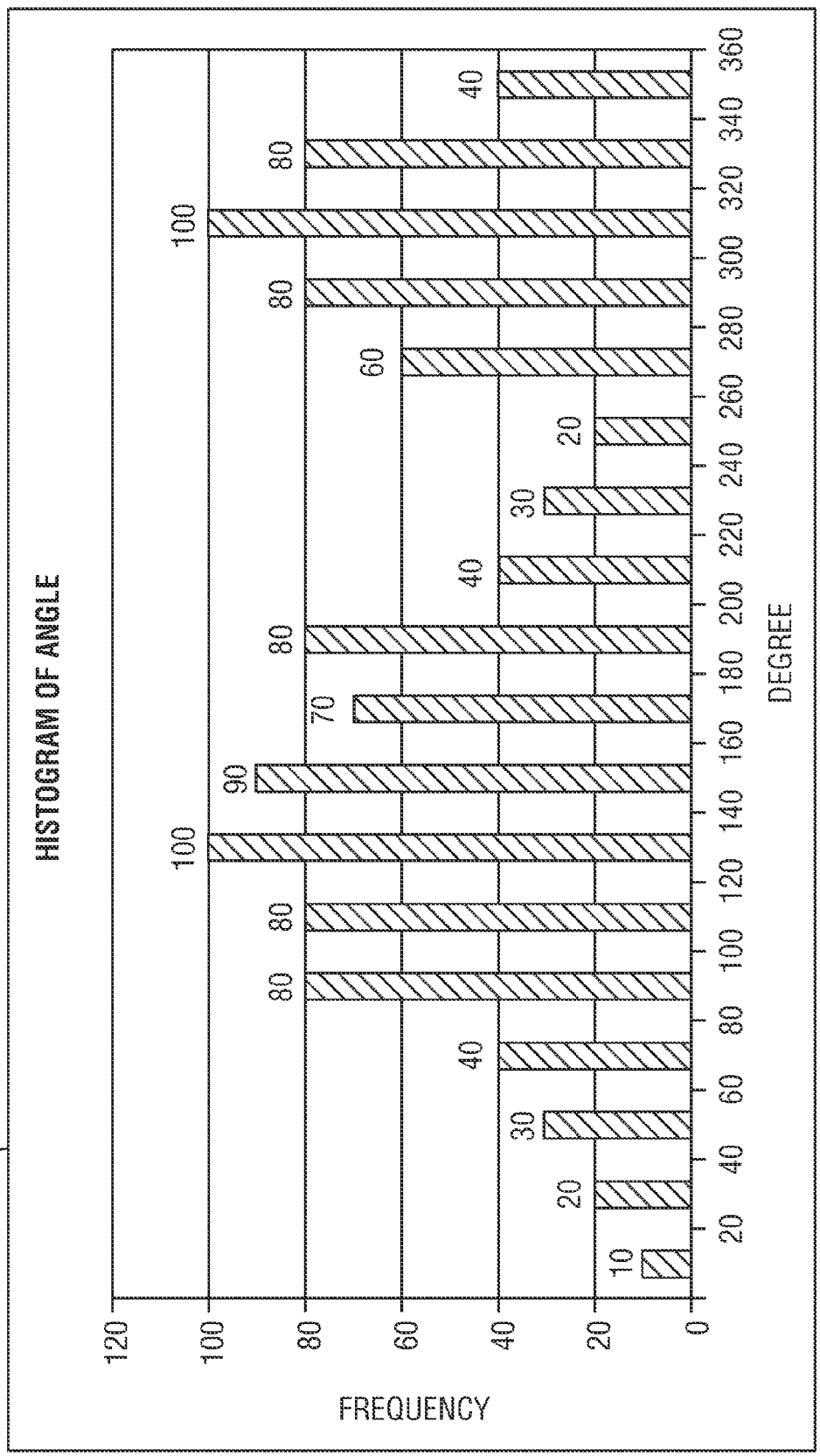
FIGS. 2A-2D depict tables and a histogram to further illustrate the techniques of the invention.

The following discussion presents an exemplary solution to a functional predicate in accordance with one embodiment of the invention. Table 1 shown in FIG. 2A can be representative of scientific experimental data, where one column named "angle" can be used to record the degree of an angle in a geometric shape and its data type is decimal(5, 2). In addition, a constraint (0.00°<angle<360.00°) is also specified on this column in the CREATE TABLE statement. The collected statistics on the column angle is depicted in Table 1 of FIG. 2A.

Today, databases can use different histograms to represent the statistics of a table column. Here, an "equi-width" histogram is shown in Table 1 for simplicity but, of course, the invention can use statistics represented in various other ways (e.g., "equi-height" histogram). In this example, a user defined function to calculate the Sine value of a degree is represented as:

$$myUDF(\text{angle}, \pi) = \sin\left(\frac{\pi * \text{angle}}{180}\right)$$

Now, consider estimating the cardinality of a sub-query with a selectivity predicate "WHERE myUDF(t1.angle, 3.1416)>0.75" or a join predicate "ON myUDF(t1.angle, 3.1416)=t2.a". Today, this can presents a difficult challenge given the UDF call since the statistics on column angle cannot be directly used. In addition, since the second parameter π can be a parameter that may be only known at the time when the query is submitted, even expression statistics may not be readily available and, hence, not useful.

It should be noted that a command or instruction can be provided to allow an optimizer to perform an analysis on the domain of a function in accordance with one embodiment of the invention. This command or instruction may also accept parameters including one indicative of the sample size to be used for the analysis. By way of example, a SQL instruction the optimizer can request an intelligent analysis for the function on the domain of column angle in the example above. The result produced from this analysis can be used to effectively transform the original predicate on the function to an approximately equal predicate on the column angle itself. Then, the statistics on angle (shown in Table 1) can be used to estimate the cardinality of the transferred predicate, which can be a close approximation of an estimation of the original predicate. For example, the SQL statement could be:

CARDINALITY ANALYSIS ON FOR FUNCTION
myUDF DOMAIN (0, 360) WITH 2000 VALUES

A carnality analysis statement can, for example, be submitted before a query with one or more function predicates is submitted. The analysis could be done by database system automatically when the statement is submitted by a database user.

In the example, a carnality analysis statement can instruct an optimizer to analyze the function myUDF(x, 3.1416) using 2000 input values for x in the range of (0, 360). As a result, the optimizer can select the input values based on the histogram of column angle. For example, as shown in Table 1, there are totally 1050 rows in the table. In range [0, 20), there are 10 rows, about 10/1050=0.95% of all the rows in the table. Then the optimizer draws 2000*0.95%=19 input values in [0, 20) starting from 0 and increasing at a pace of 20/19=1.05. So the selected values from range [0, 20) will be 0, 1.05, 2.1, 3.15, 4.2, 5.25, 6.3 ... and 18.9. As another example, in range [140, 160), there are 90 rows which is about 8.57%. Then, the optimizer can draw 2000*8.57%=171 input values starting from 140 and increasing at a pace of 0.117. So, the selected input values would be 140, 140.117, 140.234 ... and 159.89.

For the 2000 input values, the optimizer executes myUDF (x, 3.1416) 2000 times to get a returned value for each input. These return values will be saved in an array one by one like below for later use in cardinality estimation:

| Array[i].x      | 0       | 1.05    | 2.1     | ... | 140.117 | ... | 360     |
|-----------------|---------|---------|---------|-----|---------|-----|---------|
| Array[i].myUDF  | 0.00000 | 0.00032 | 0.00064 | ... | 0.04265 | ... | 0.00000 |

This array can be searched once to pin-point all sub-ranges of x in domain (0, 360) that can make "myUDF(x, 3.1416) >0.75". Various algorithms can be used to locate each of the sub-ranges as will be appreciated by those skilled in the art. For example, starting with index=0, an algorithm can look for the first Array[index].myUDF that is larger than 0.75. If it doesn't exist, then all sub-ranges have been located. If it exists, then the low bound of the sub-range would be Array [index−1].x. Then the algorithm can start with the current index to look for the first Array[index].myUDF that is smaller than 0.75. If it exists, Array[index].x is the high bound of the current sub-range. If it doesn't exist, then the high bound is set to 360. Once a sub-range is located, it can be saved and this process can be repeated to locate the next sub-range starting with index+1.

Figure 2B:
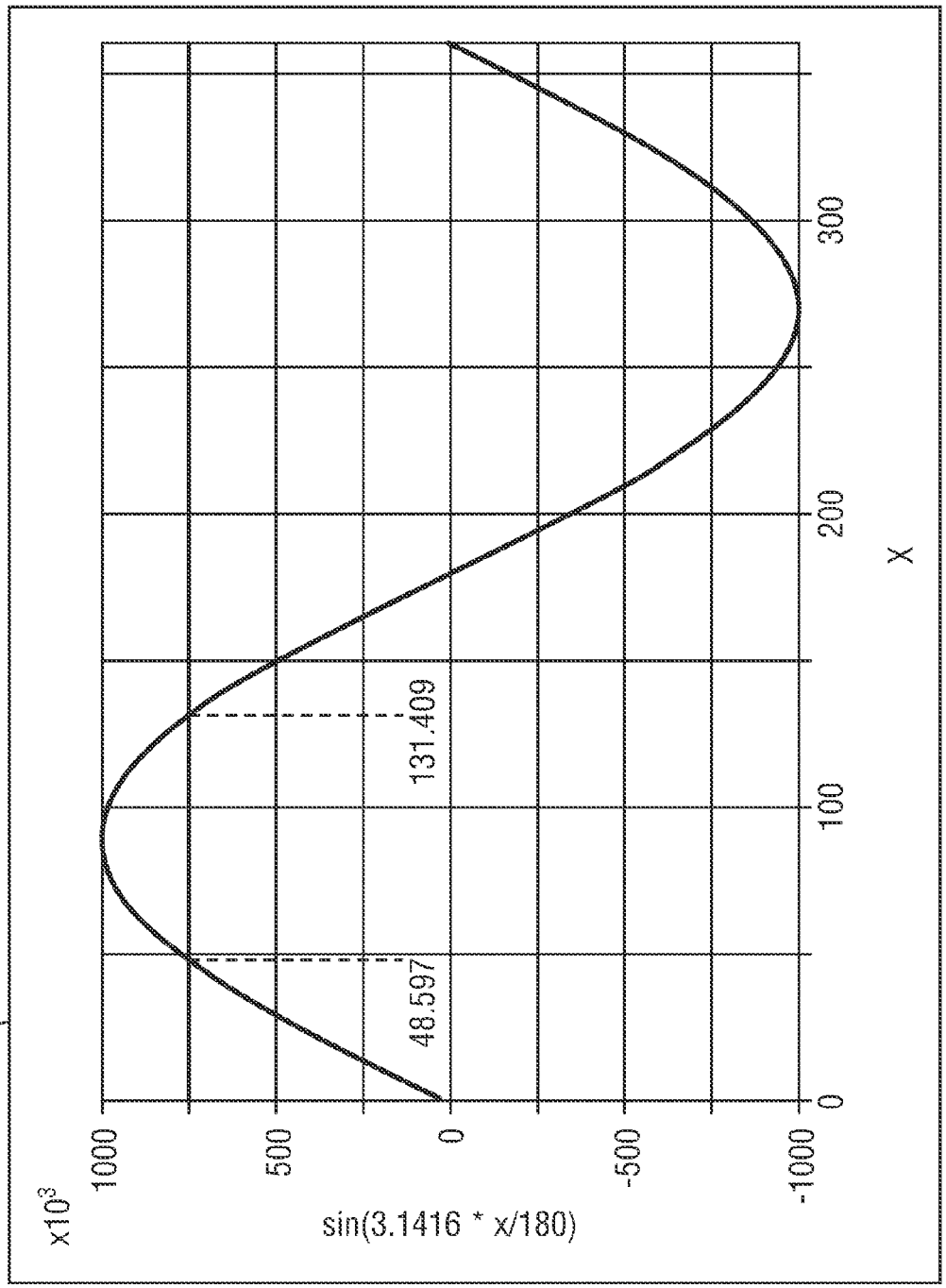

The result of the above searching algorithm can be illustrated by a plot of the function as shown in TABLE 2 depicted in FIG. 2B.

Although it may not necessarily true, suppose for the sake of dissection that (48.597, 131.409) is the sub-range that the above algorithm can find from the array for x in domain (0, 360). Then the optimizer can convert the predicate "WHERE myUDF(x, 3.1416)>0.75" to another approximately equivalent predicate "WHERE x>48.597 and x<131.409", and utilizes the statistics on the column angle to estimate the cardinality for the equivalent predicate. Since the two predicates can be approximately equivalent, one can be estimated based on the others as the values can be close, if not a very close, to each other.

In this example, according to FIG. 1, the cardinality for "WHERE x>48.597 and x<131.409" will be estimated as:

$$30*(48.597-40)/20+40+80+80+100*(131.409-120)/20 \approx 270$$

Finally, the optimizer is ready to say that the cardinality of selective predicate "WHERE myUDF(x, 3.1416)>0.75" would be about 270. This result will be used for join plan determination.

It should also be noted that the invention can be used to improve the performance of scan operations on tables (table scan operations). To further elaborate, in the example noted above, the approximately equivalent predicate "WHERE x>48.597 and x<131.409" in b.3 can be used in query rewriting process to improve the overall performance of the table scans. When the column x is indexed, the index access can be used to avoid full table scan. When the column x is not indexed, the simpler predicate "WHERE x>48.597 and x<131.409" could be evaluated first before doing the expensive UDF call. If the simpler predicate can help eliminate many unqualified rows, then the cost of calling UDF for these rows can be saved. In both cases, the performance of the table scan can be increased.

Figure 2C:
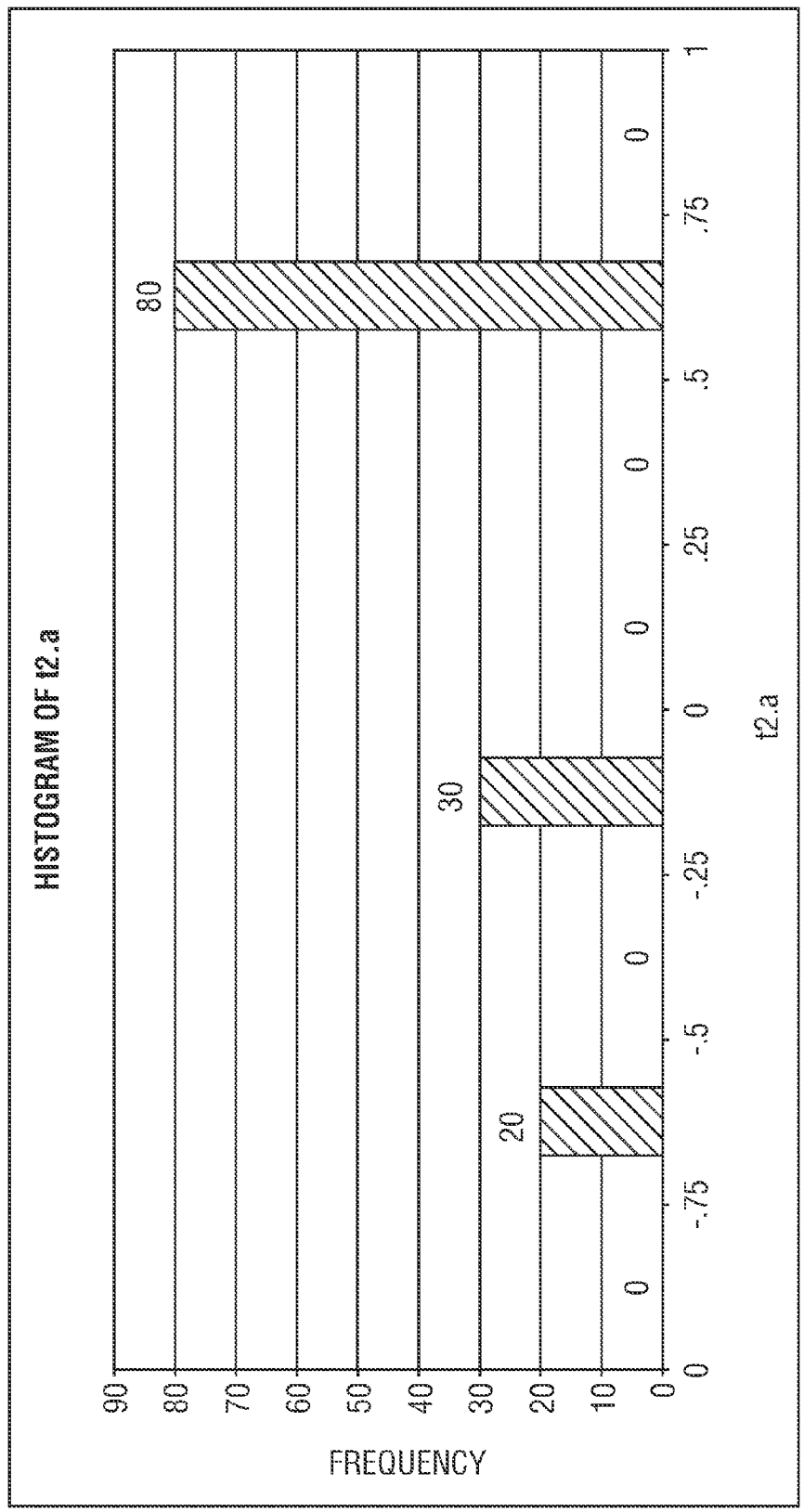

In addition, the cardinality of a join predicate can be estimated. Suppose t2 is another table and its column t2.a is FLOAT type and is in range between −1.0 and 1.0. The cardinality of the predicate "ON myUDF(t1.angle, 3.1416) =t2.a" can be estimated in a similar manner. Suppose statistics are collected for column t2.a as shown in a histogram depicted in FIG. 2C.

Then, first it can be determined how many sub-ranges in t1.angle could make one of the following true:

myUDF(t1.angle,3.1416)>=0.5 and myUDF(t1.angle, 3.1416)<0.75 or myUDF(t1.angle,3.1416)>=−0.25 and myUDF (t1.angle,3.1416)<0 or myUDF(t1.angle,3.1416)>=−0.75 and myUDF (t1.angle,3.1416)<−0.5

Figure 2D:
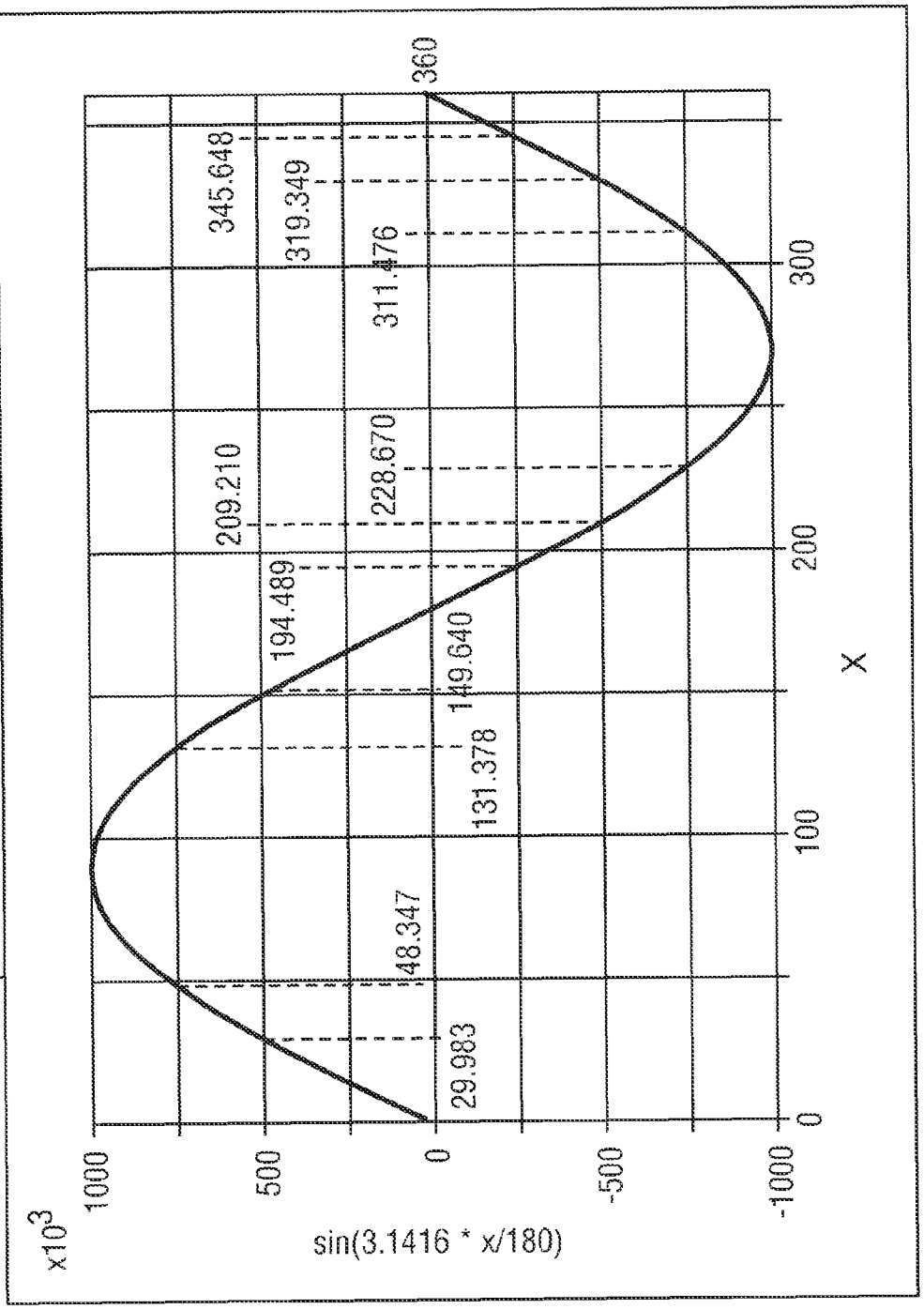

A sub-range searching algorithm such as, for example, the one described above can be used here with some minor changes as those skilled in the art will readily appreciate. The sub-ranges that can be produced are illustrated by a plot like figure in Table 3 shown in FIG. 2D.

When t1.angle is in range (29.983, 48.347) and (131.378, 149.640), there are a total of about 20*(40−29.983)/20+30* (48.347−40)/20+100*(140−131.378)/20+90*(149.640− 140)/20=119 rows according to the histogram of t1.angle. The t1.angle values in the two ranges will make myUDF (t1.angle, 3.1416) fall into (0.5, 0.75), where t2.a has about 20 rows according to the histogram of t2.a. So, when they are joined, there will be 119*20=2380 rows. Using the same method, the number of resultant rows can be estimated from joining t1 and t2 with t1.angle in range (180, 194.489) and (345.648, 360) and t2.a in range (−0.25, 0). The estimated number for the join result is about 2700 rows. Similarly, the estimated number of rows can be estimated from joining t1 and t2 with t1.angle in range (209.216, 228.670) and (311.478, 319.349) and t2.a in range (−0.75, −0.5) which is about 5840 rows. So, the total estimated cardinality for the join predicate "ON myUDF(t1.angle, 3.1416)=t2.a" could be about 2380+2700+5840=10920 rows.

The applicability of the estimation techniques to a specific function in a specific query could depend on the nature of the column data, the mathematic property, and CPU cost of evaluating the function. The techniques are especially useful for continuous functions. A continuous function can be a function for which small changes in the input are likely to result in small changes in the output. As such, the techniques can be applied to virtually an unlimited functions and combinations of functions, including, for example, and of course, not limited, to all polynomial functions, exponential functions, logarithms, trigonometric functions, and so on. For non-continuous functions, information about the input values that may cause jumps in the returned values can be used to make similar estimation using the techniques of the invention. The techniques are also especially useful in situation where a relatively large number of column values need not be considered unless the function is a continuous function.

From a computation cost perspective, the techniques of the invention are especially well suited when the CPU cost of the function is modest to low. Considering some functions like $\sin(x)$ or $x^2+x+1$, it may be that calling these functions on the fly 100 thousand times is just fast enough to be used as part of the query optimizing job. If the whole query is taking minutes or hours to finish, then the cost for the cardinality analysis during optimizing is worthwhile. This is at least partly because the analysis may significantly improve the decision on join plans, which usually can have a great impact on the overall performance of the query. For the functions with very high CPU cost, the functional analysis can be done offline and the analysis results can, for example, be saved in a dictionary table for later use in optimizing the function predicate queries.

It should also be noted that to further assist database users in determining whether a specific function is to be used as a good candidate for a selective estimation, a Graphical User Interface (GUI) tool can be provided in accordance with one embodiment of the invention. This tool can, for example, plot a function with a fine resolution in the domain of the input. This can illustrate the property of the function and estimate the average CPU cost of one function call. The database user can then decide whether to use the selective estimation techniques of the invention and the number of selective point values to be used in the estimation analysis. As those skilled in the art will readily appreciate, a function plot tool can be, for example, be provided using various tools that are readily available today (see, for example, "Plot a Graph" tool currently available on: "http://www.pa.uky.edu/~phy211/graph_applets/plot_graph.html").

Figure 3:
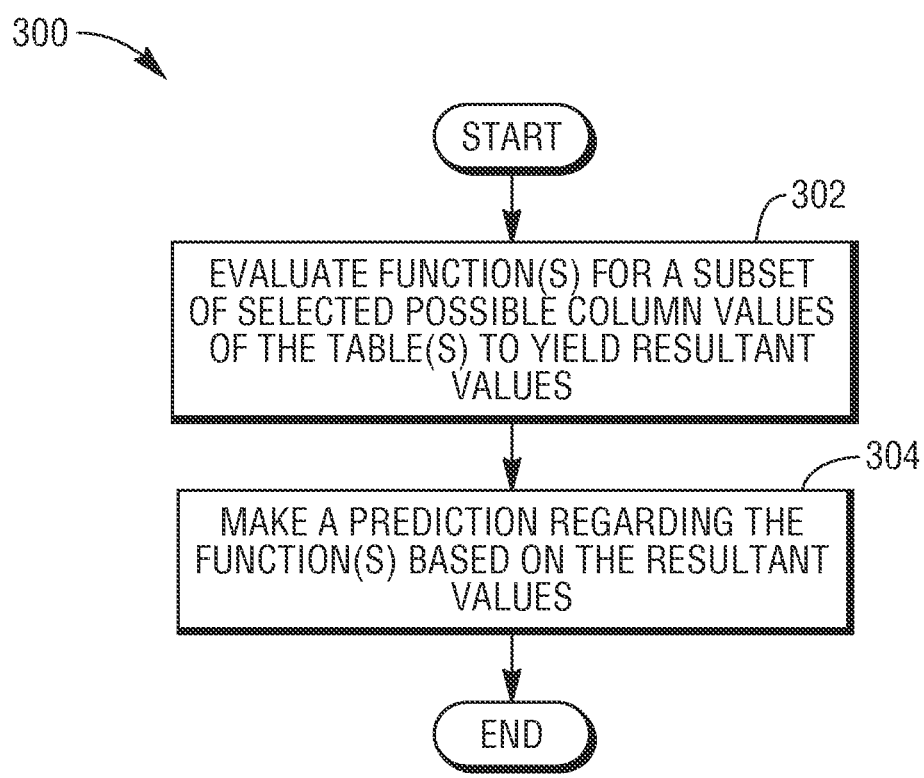
FIG. 3 depicts a prediction method for making a prediction regarding one or more functions with respect to values stored in at least one column of at least one table in a database in accordance with one embodiment of the invention.

To elaborate still further, FIG. 3 depicts a prediction method 300 for making a prediction regarding one or more functions with respect to values stored in at least one column of at least one table in a database in accordance with one embodiment of the invention. Typically, the prediction is made for a database operation that depends on the evaluation of the one or more functions for values in one or more columns of the database. The prediction method 300 can, for example, be used by the function-based query selective estimator 102 depicted in FIG. 1.

Referring to FIG. 3, initially, multiple resultants values are obtained (302). It should be noted that the resultant values are values determined by evaluating the one or more functions for a subset of possible column values of the at least one column of the at least one table. Accordingly, a prediction can be made (304) regarding the one or more functions based on the multiple resultants values. Thereafter, the predication method 300 can end.

Figure 4A:
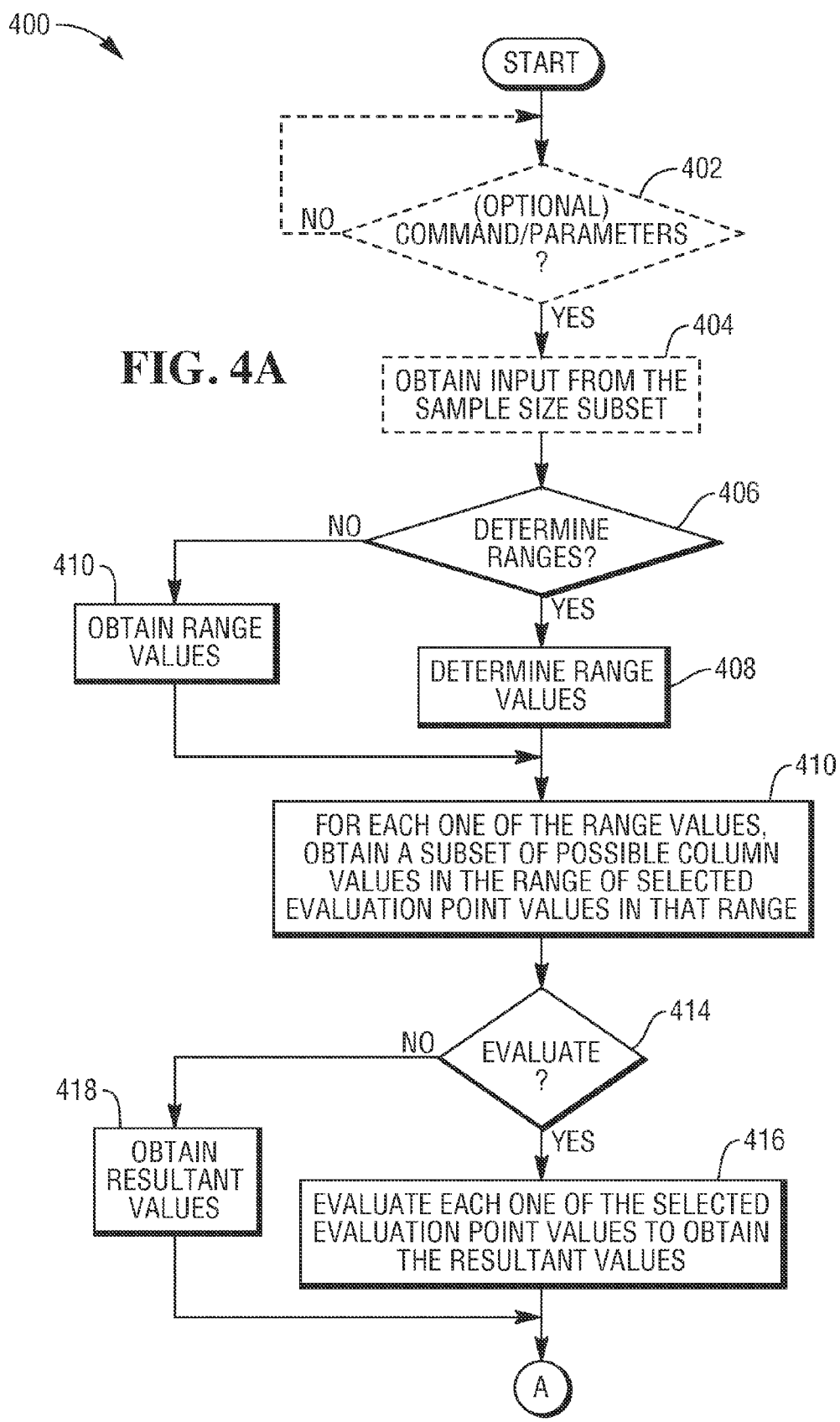
FIGS. 4A-B depict of method for determining cardinality of a database operation in accordance with one embodiment of the invention.
Figure 4B:
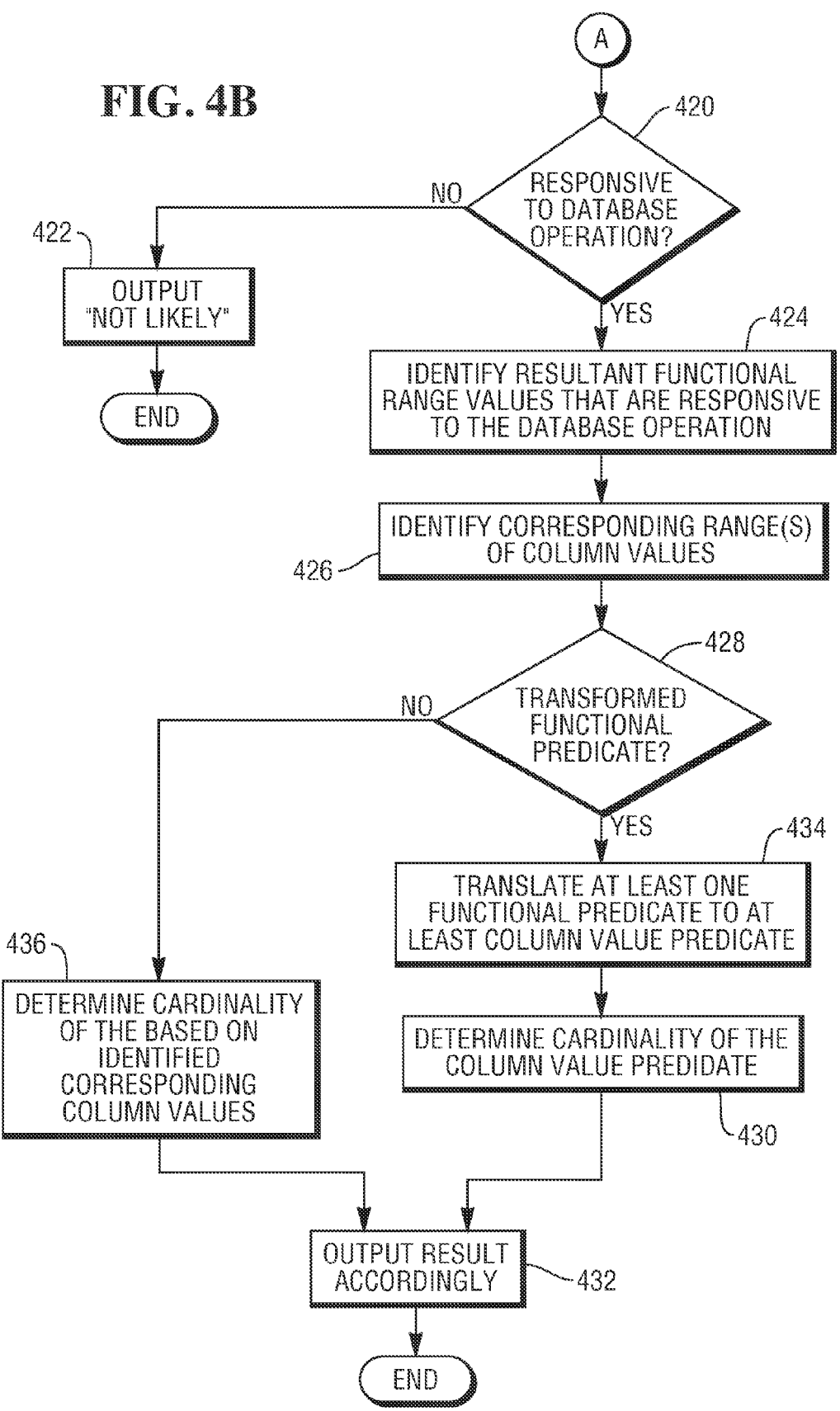

To elaborate still further, FIGS. 4A-B depict of method 400 for determining cardinality of a database operation in accordance with one embodiment of the invention. It should be noted that the cardinality of the database operation depends on an evaluation of at least one function for column values of at least one column of at least one table of a database. The prediction method 300 can, for example, be used by the function-based query selective estimator 102 depicted in FIG. 1.

Referring to FIG. 4A, optionally, it can be determined (402) whether a command with one or more parameters is received. The command can, for example, be a command initiated by a database user and indicative of a request for selective estimation analysis of cardinality of a database operation (e.g., a database query). The command can also provide at least one parameter indicative of the number of evaluation points to be used in the analysis. As such, method 400 can effectively wait (402) to receive a command and/or one or more parameters, and one or more parameters can be obtained (404). Next, it can be determined (406) whether there is a need to determine multiple ranges of possible column values for at least one column of at least one table in the database. Accordingly, multiple ranges of possible column values can be determined (408) for example, by calculating the ranges based on an input parameter. Alternatively, the multiple ranges of possible column values can be obtained (410), for example, as input provided to method 400. In any case, for each one of the range of possible column values a subset of possible column values in the range of column values are obtained (412), for example, by determining them or receiving them as input. As a result, for each one of the ranges of possible column values, one or more evaluation point values can be selected to yield "multiple selected evaluation point values." Thereafter, it can be determined (414) whether there is a need to evaluate the one or more functions for the selected evaluation point values to yield resultant functional values. Accordingly, the one or more functions for the selected evaluation point values can be evaluated (416) by the method 400 to yield the resultant functional values or obtained (418) for example, by reading them from storage or receiving them from an external component and/or process.

Referring now to FIG. 4B, the method 400 can continue to determine (420) whether the resultant functional values are responsive to the database operation. If it determined (420) that the resultant functional values are not responsive to the database operation, for example, "not likely" can be output (422) before the method 400 ends.

However, one or more ranges of the resultant functional values (or resultant functional value ranges) can be identified (422) if it is determined (420) that at least one resultant functional value is responsive to the database operation. Next, one or more ranges of column values that correspond to the one or more identified ranges of the resultant values can be identified as corresponding ranges of column values (428). Generally, the cardinality of the database can be determined (436) based on the corresponding ranges of column values and the result can be output (432) accordingly before the method 400 ends.

In doing so, however, one or more functional predicates associated with the cardinality of the database operation can be optionally translated (434) into one or more corresponding predicates based on column values when it is optionally determined (428) to transform or translate one or more functional predicates associated with the cardinality of the database operation into one or more corresponding predicates based on values on one or more columns (not dependent on evaluation of one or more functions for the values in the one or more columns. Thereafter, the cardinality of the one or more predicates that are dependent on the values of the column(s) can be determined (430) and output (432) as the carnality of the corresponding one or more functional predicates before the method 400 ends.

Multi-Node, Parallel Database Systems

The techniques described above are especially suitable for multi-node, parallel databases, including those that use a massively parallel processing (MPP) architecture or system as, for example, the operations associated with multiple ranges of possible values can be distributed among multiple processing components and processed in parallel.

Figure 5:
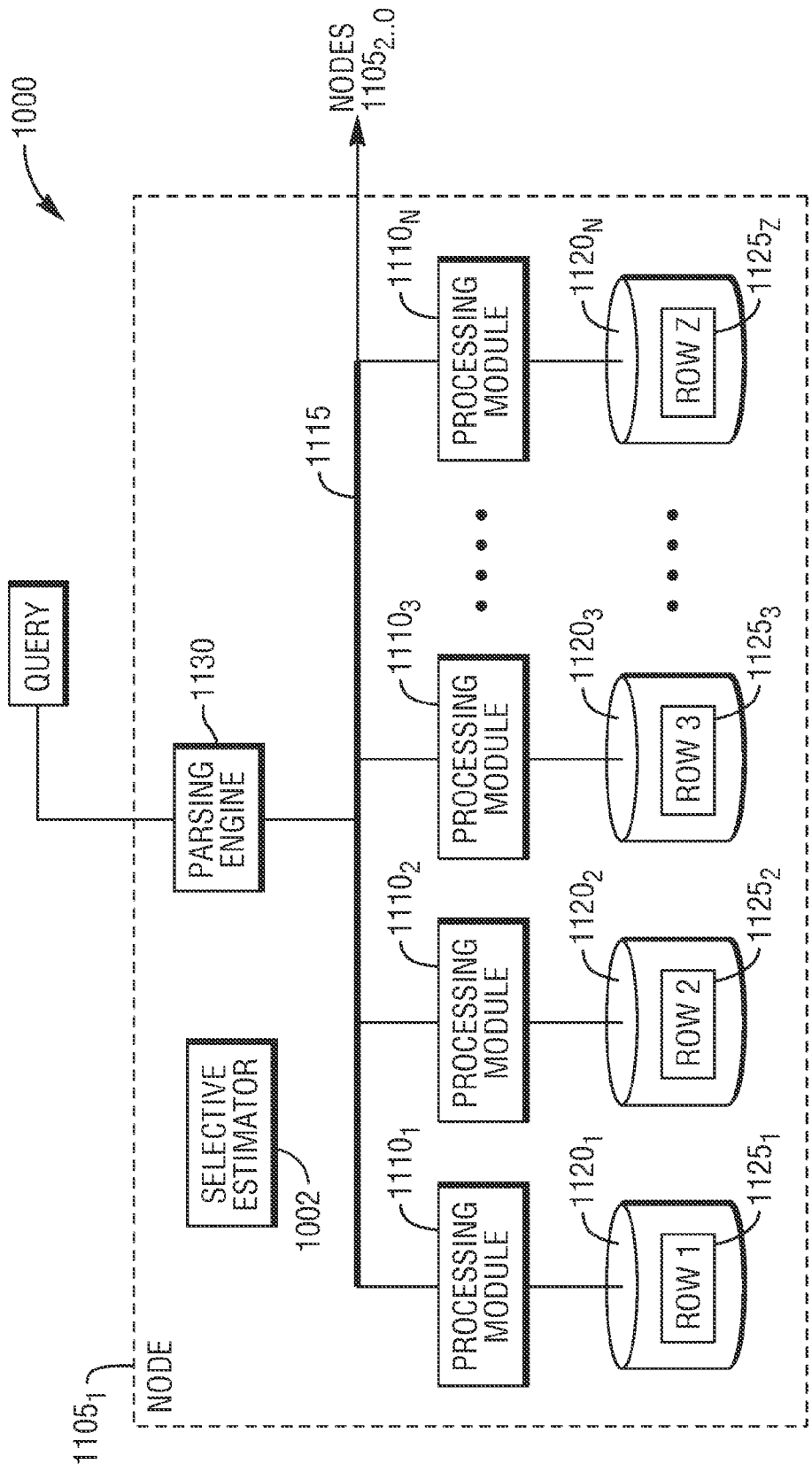
FIG. 5 depicts a database node of a database system or Database Management System (DBMS) in accordance with one embodiment of the invention.

To further elaborate, FIG. 5 depicts a database node 1105 of a database system or Database Management System (DBMS) 1000 in accordance with one embodiment of the invention. The database system 1000 can, for example, be provided as a Teradata Active Data Warehousing System. It should be noted that FIG. 5 depicts an exemplary architecture for one database node $1105_1$ of the DBMS 1000 in accordance with one embodiment of the invention. Referring to FIG. 5, the DBMS node $1105_1$ includes one or more processing modules 1110-N connected by a network 1115, that manage the storage and retrieval of data in data-storage facilities $1120_{1-N}$. Each of the processing modules 1110-N can represent one or more physical processors or virtual processors, with one or more virtual processors (e.g., Access Module Processor (AMP)) running on one or more physical processors.

For the case in which one or more virtual processors are running on a single physical processor, the single physical processor swaps between the set of N virtual processors. For the case in which N virtual processors are running on an M-processor node, the node's operating system schedules the N virtual processors to run on its set of M physical processors. By way of example, if there are four (4) virtual processors and four (4) physical processors, then typically each virtual processor could run on its own physical processor. As such, assuming there are eight (8) virtual processors and four (4) physical processors, the operating system could schedule the eight (8) virtual processors against the four (4) physical processors, in which case swapping of the virtual processors could occur.

In the database system 1000, each of the processing modules $1110_{1-N}$ can manage a portion of a database stored in a corresponding one of the data-storage facilities $1120_{1-N}$. Also, each of the data-storage facilities $1120_{1-N}$ can include one or more storage devices (e.g., disk drives). It should be noted that the DBMS 1000 may include additional database nodes $1105_{2-O}$ in addition to the node $1105_1$. The additional database nodes $1105_{2-O}$ are connected by extending the network 1115. Data can be stored in one or more tables in the data-storage facilities $1120_{1-N}$. The rows $1125_{1-z}$ of the tables can be stored across multiple data-storage facilities $1120_{1-N}$ to ensure that workload is distributed evenly across the processing modules $1110_{1-N}$. A parsing engine 1130 can organize the storage of data and the distribution of table rows $1125_{1-z}$ among the processing modules $1110_{1-N}$. The parsing engine 1130 can also coordinate the retrieval of data from the data-storage facilities $1120_{1-N}$ in response to queries received, for example, from a user. The DBMS 1000 usually receives queries and commands to build tables in a standard format, such as SQL.

In one implementation, the rows $1125_{1-z}$ are distributed across the data-storage facilities $1120_{1-N}$ by the parsing engine 1130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $1120_{1-N}$ and associated processing modules $1110_{1-N}$ by a hash bucket map. The characteristics of the columns chosen for the primary index determine how evenly the rows are distributed.

Referring to FIG. 5, it should be noted that a function-based query selective estimator (or selective estimator) 1002 can be provided. It should be noted that the selective estimator 1002 can be provide as a separate entity (or component, or module) or it can at least partially be implemented in the parsing engine 1130.

Figure 6:
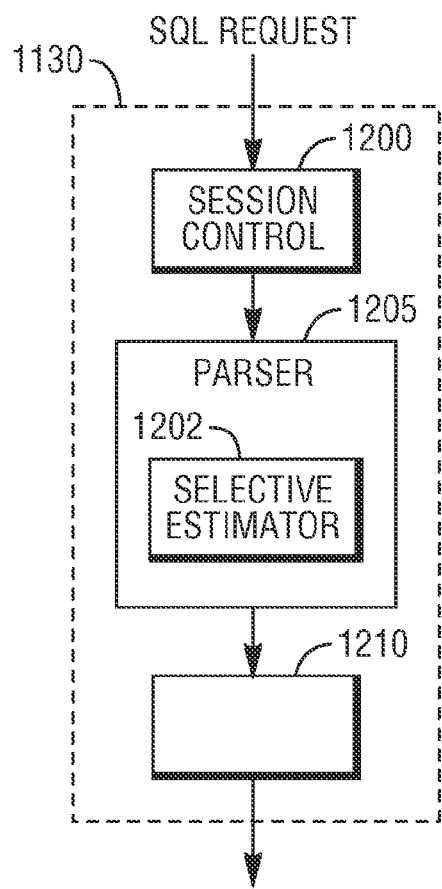
FIGS. 6 and 7 depicts a parsing engine for a database system in accordance with one embodiment of the invention.

In one exemplary system, the parsing engine 1130 is made up of three components: a session control 1200, a parser 1205, and a dispatcher 1210, as shown in FIG. 6. The session control 1200 provides the logon and logoff function. It accepts a request for authorization to access the database, verifies it, and then either allows or disallows the access. When the session control 1200 allows a session to begin, a user may submit a SQL request, which is routed to the parser 1205. The dispatcher 1210 provides an internal status of every session and request running on the system. It does this by using internal messages sent from the AMPs to the dispatcher 1210. The dispatcher 1210 provides an internal status of every session and request running on the system. It should be noted that that parser 1205 can provide a function-based query selective estimator (or selective estimator) 1202 in accordance with one embodiment of the invention.

Figure 7:
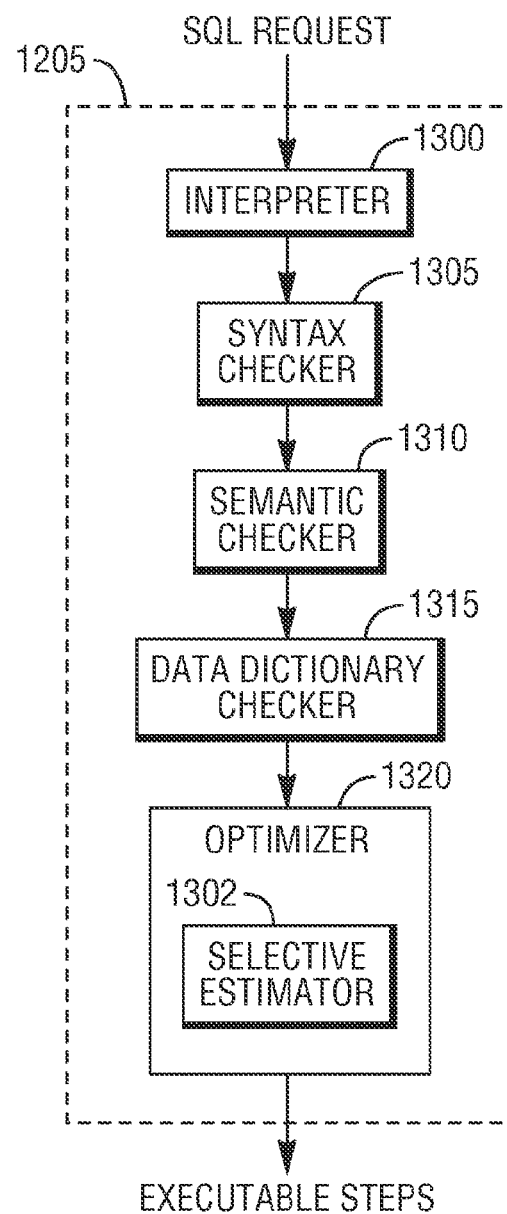

As illustrated in FIG. 7, the parser 1205 interprets the SQL request (block 1300), checks it for proper SQL syntax (block 1305), evaluates it semantically (block 1310), and consults a data dictionary to ensure that all of the objects specified in the SQL request actually exist and that the user has the authority to perform the request (block 1305). Finally, the parser 1205 runs an optimizer (block 1320), which generates the least expensive plan to perform the request. It will be appreciated that the optimizer (block 1320) can provide a function-based query selective estimator (or selective estimator) 1302 in accordance with one embodiment of the invention.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method of determining cardinality of a database operation that depends on an evaluation of at least one function for column values of at least one column of at least one table of a database, the computer-implemented method comprises:
   obtaining determined multiple ranges of possible column values for the at least one column of the at least one table;
   for each one of the multiple ranges of possible column values, obtaining a subset of possible column values in the range of column values as selected evaluation point values in the range;
   obtaining resultant functional values for the selected evaluation point values;
   identifying one or more ranges of the resultant functional values that are responsive to the database operation;
   identifying one or more corresponding column range values corresponding to the one or more resultant functional range values; and
   determining the cardinally of the database operation based on the identified corresponding column range values by at least:

transforming the cardinality of at least one functional predicate to cardinality of column values of the at least one column;

determining the cardinality of the column values; and outputting the cardinality of the column values as the cardinality of the database operation.

2. The computer-implemented method of claim 1, wherein the database operation includes and/or is responsive to a database request and/or query.

3. The computer-implemented method of claim 1, wherein the computer-implemented method further comprises: receiving a database command indicative of optional use of cardinality analysis and including a number of for the subset of possible column values to be used.

4. The computer-implemented method of claim 1, wherein the at least one function includes at least one continuous functions.

5. The computer-implemented method of claim 1, wherein the range of the possible of column values can be predetermined and/or is within a determined range of possible values.

6. A computing system that include one or more processors operable to determine cardinality of a database operation that depends on an evaluation of at least one function for column values of at least one column of at least one table of a database, wherein the one or more processors are configured to:

obtain multiple ranges of possible column values for the at least one column of the at least one table;

for each one of the multiple ranges of possible column values, obtain a subset of possible column values in the range of column values as selected evaluation point values in the range;

obtain resultant functional values for the selected evaluation point values;

identify one or more ranges of the resultant functional values that are responsive to the database operation;

identify one or more corresponding column range values corresponding to the one or more resultant functional range values; and determine the cardinally of the database operation based on the identified corresponding column range values by at least:

transforming the cardinality of at least one functional predicate to cardinality of column values of the at least one column;

determining the cardinality of the column values; and outputting the cardinality of the column values as the cardinality of the database operation.

7. The computing system of claim 6, wherein the database operation includes and/or is responsive to a database request and/or query.

8. The computing system of claim 6, wherein the wherein the one or more processors are further configured to:

receive a database command indicative of optional use of cardinality analysis and including a number of for the subset of possible column values to be used.

9. The computing system of claim 6, wherein the at least one function includes at least one continuous functions.

10. The computing system of claim 6, wherein the range of the possible of column values can be predetermined and/or is within a determined range of possible values.

11. A non-transient computer readable storage medium storing at least executable code that when executed determines cardinality of a database operation that depends on an evaluation of at least one function for column values of at least one column of at least one table of a database, by at least:

obtaining multiple ranges of possible column values for the at least one column of the at least one table;

for each one of the multiple ranges of possible column values, obtaining a subset of possible column values in the range of column values as selected evaluation point values in the range;

obtaining resultant functional values for the selected evaluation point values;

identifying one or more ranges of the resultant functional values that are responsive to the database operation;

identifying one or more corresponding column range values corresponding to the one or more resultant functional range values; and determining the cardinally of the database operation based on the identified corresponding column range values by at least:

transforming the cardinality of at least one functional predicate to cardinality of column values of the at least one column;

determining the cardinality of the column values; and outputting the cardinality of the column values as the cardinality of the database operation.

12. The non-transient computer readable storage medium of claim 11, wherein the database operation includes and/or is responsive to a database request and/or query.

13. The non-transient computer readable storage medium of claim 11, wherein determining of the cardinality of the database further comprises:

receiving a database command indicative of optional use of cardinality analysis and including a number of for the subset of possible column values to be used.

14. The non-transient computer readable storage medium of claim 11, wherein the at least one function includes at least one continuous functions.

15. The non-transient computer readable storage medium of claim 11, wherein the range of the possible of column values can be predetermined and/or is within a determined range of possible values.

* * * * *